United States Patent
Liu et al.

(10) Patent No.: US 12,256,659 B1
(45) Date of Patent: Mar. 25, 2025

(54) SPRING PLOUGHING AND LAND PREPARATION METHOD THROUGH THAWING AND WATER PUDDLING FOR SALINE-SODIC PADDY FIELDS AND APPLICATION THEREOF

(71) Applicant: Northeast Institute of Geography and Agroecology, Chinese Academy of Sciences, Changchun (CN)

(72) Inventors: Hongyuan Liu, Changchun (CN); Ding Wang, Shenyang (CN); Qingquan Xu, Daqing (CN); Yanhong Zhou, Changchun (CN); Xintong Liu, Changchun (CN)

(73) Assignee: Northeast Institute of Geography and Agroecology, Chinese Academy of Sciences, Changchun (CN)

( * ) Notice: Subject to any disclaimer, the term of this patent is extended or adjusted under 35 U.S.C. 154(b) by 0 days.

(21) Appl. No.: 18/931,322

(22) Filed: Oct. 30, 2024

(30) Foreign Application Priority Data

Apr. 1, 2024 (CN) .......................... 202410387808.3

(51) Int. Cl.
*A01B 79/02* (2006.01)
(52) U.S. Cl.
CPC .................................. *A01B 79/02* (2013.01)
(58) Field of Classification Search
CPC ........ A01B 79/00; A01B 79/005; A01B 79/02
See application file for complete search history.

(56) References Cited

U.S. PATENT DOCUMENTS

| | | | |
|---|---|---|---|
| 6,525,276 B1* | 2/2003 | Vellidus | A01D 41/1217 177/136 |
| 9,140,824 B1* | 9/2015 | Mewes | A01D 91/00 |
| 11,064,645 B2* | 7/2021 | Shearer | B60K 23/00 |
| 11,212,962 B2* | 1/2022 | Hendrickson | G01N 33/24 |
| 11,395,452 B2* | 7/2022 | McDonald | A01C 7/203 |
| 11,707,017 B1 | 7/2023 | Liu | |
| 2012/0323452 A1* | 12/2012 | Green | A01B 79/005 701/50 |

(Continued)

FOREIGN PATENT DOCUMENTS

| | | |
|---|---|---|
| CN | 105453967 A | 4/2016 |
| CN | 107484454 A | 12/2017 |

(Continued)

OTHER PUBLICATIONS

Retrieval report dated dated May 6, 2024 in SIPO application No. 202410387808.3.

(Continued)

*Primary Examiner* — Jamie L McGowan
(74) *Attorney, Agent, or Firm* — Pilloff Passino & Cosenza LLP; Rachel Pilloff; Sean Passino (57) ABSTRACT

A method for spring ploughing and land preparation in saline-sodic paddy fields with thawed water puddling and an application thereof are provided, relating to the technical field of spring ploughing and land preparation in saline-sodic paddy fields. The method includes the following steps: harvesting rice with low stubble left; removing straws from the paddy fields: removing straws after harvesting from fields; ploughing; fertilizing; irrigating for thawing; and drying.

1 Claim, 3 Drawing Sheets

(56) References Cited

U.S. PATENT DOCUMENTS

| | | | | |
|---|---|---|---|---|
| 2013/0000535 | A1* | 1/2013 | Martin | A01B 49/06 |
| | | | | 172/1 |
| 2014/0236431 | A1* | 8/2014 | Hendrickson | A01B 69/007 |
| | | | | 701/50 |
| 2018/0206393 | A1* | 7/2018 | Stoller | A01B 49/06 |
| 2019/0090432 | A1* | 3/2019 | Duquette | G06Q 10/06 |
| 2020/0000006 | A1* | 1/2020 | McDonald | A01B 79/005 |
| 2020/0217044 | A1* | 7/2020 | Martel | A01C 7/06 |

FOREIGN PATENT DOCUMENTS

| | | | | | |
|---|---|---|---|---|---|
| CN | 110024634 | A | * | 7/2019 | |
| CN | 111165112 | A | | 5/2020 | |
| CN | 112075304 | A | * | 12/2020 | |
| CN | 112889606 | A | | 6/2021 | |
| CN | 114128433 | A | | 3/2022 | |
| CN | 114287193 | A | | 4/2022 | |
| CN | 114667819 | A | | 6/2022 | |
| CN | 115336513 | A | * | 11/2022 | |
| CN | 117957966 | A | * | 5/2024 | A01B 79/00 |
| WO | 2023232087 | A | | 12/2023 | |

OTHER PUBLICATIONS

Retrieval report dated dated Jul. 12, 2024 in SIPO application No. 202410387808.3.
Notification to Grant Patent Right for Invention dated dated Jul. 16, 2024 in SIPO application No. 202410387808.3.
Office action dated dated May 7, 2024 in SIPO application No. 202410387808.3.

* cited by examiner

SPRING PLOUGHING AND LAND PREPARATION METHOD THROUGH THAWING AND WATER PUDDLING FOR SALINE-SODIC PADDY FIELDS AND APPLICATION THEREOF

CROSS-REFERENCE TO RELATED APPLICATIONS

This application claims priority to Chinese Patent Application No. 202410387808.3, filed on Apr. 1, 2024, the contents of which are hereby incorporated by reference.

TECHNICAL FIELD

The present disclosure relates to the technical field of spring ploughing and land preparation in saline-sodic paddy fields, and in particular to a spring ploughing and land preparation method through thawing and water puddling for saline-sodic paddy fields and an application thereof.

BACKGROUND

The quality of spring ploughing and land preparation of paddy fields is a key factor in determining rice yield, especially for the saline-sodic paddy fields mainly distributed in the western Songnen plain. Due to the high content of carbonate ions, bicarbonate ions, and exchangeable sodium ions and the sticky and heavy texture of saline-sodic paddy soils, the soil dispersion is extremely strong, resulting in low water permeability and air permeability, and poor structure, which is insufficient to support transplanting machinery and rice seedlings, therefore, not only the quality of transplanting is lowered, but also the growth of rice is inhibited, resulting in yield losses. Despite the fact that returning straw to the field is in line with the requirements of long-term sustainable agricultural development, straw leaving the field is still an important type that will exist for quite a long time to come due to regional economic, mechanical and technological constraints, making it still important to explore methods of spring ploughing and land preparation with straws removed from the fields for saline-sodic paddy fields.

At present, the main method of spring ploughing and land preparation in saline-sodic paddy fields is conventional water puddling, which involves the use of tractor mounted with a puddling machine to carry out puddling operations with water on the field surface after applying base fertilizers, rotary ploughing, and soaking the field from late April to early May. Since the tillage layer of 15 centimeters (cm) has completely thawed in this time period, the sublayer under the tillage layer has also partially thawed, of which the thawing process will be accelerated by the heat conduction between the soil and the water during irrigation and soaking. Moreover, due to the strong dispersion of saline-sodic soil, although it is generally required that the puddling operation should be kept at 15 cm in depth, when the puddling operation is carried out, the strength of the sublayer is not strong enough to support the rolling of the wheels of the operation vehicle, resulting in the formation of deep ruts, and the repeated rolling of the wheels and common occurrence of deep ruts will eventually lead to too deep puddling, and the field is too muddy to cause a reduction in the quality of mechanical transplanting, and the seedlings are likely to sink after being transplanted due to insufficient soil support, which will severely inhibit subsequent seedling rejuvenation and growth, resulting in yield losses. In addition, the support force for the wheels during mechanical seedling transplanting mainly comes from the plough pan, and the deep ruts remained lead to the unevenness of the plough pan, thus increasing the difficulty of seedling-transplanting operation, lowering the quality of seedling transplanting, and further inhibiting the growth of seedlings and causing yield losses.

In summary, the method for spring ploughing and land preparation applicable to saline-sodic paddy fields in the western Songnen plain must overcome the problems of shallow tillage layer, strong soil dispersion, poor water permeability and air permeability, and insufficient support of the plough pan. Based on the above analysis and practical experience, it is necessary to develop a new spring ploughing and land preparation method through thawing and water puddling for saline-sodic paddy fields.

SUMMARY

The objectives of the present disclosure are to provide a spring ploughing and land preparation method through thawing and water puddling for saline-sodic paddy fields and an application thereof, so as to solve the problems existing in the prior art.

In order to achieve the above objectives, the present disclosure provides the following schemes.

The present disclosure provides a spring ploughing and land preparation method through thawing and water puddling for saline-sodic paddy fields in the western Songnen plain, including the following steps:
(1) harvesting rice with low stubble left;
(2) removing straws from the paddy fields: removing straws after harvesting from the paddy fields;
(3) ploughing: ploughing at a surface depth of 14-16 cm;
(4) fertilizing;
(5) irrigating for thawing: irrigating the paddy fields for thawing from late March to early to mid-April, making an overall thawed depth of 11-13 cm;
(6) carrying out water puddling operation: carrying out the water puddling operation, and an operation depth is 11-13 cm; and
(7) drying.

In an embodiment of the present disclosure, an average stubble height of the rice is ≤15 cm.

In an embodiment of the present disclosure, a missing ploughing rate is ≤5%, and a re-ploughing rate is ≤5%.

In an embodiment of the present disclosure, a drying duration is not less than 20 days, and a soil drying depth after the drying is not less than 10 cm.

In an embodiment of the present disclosure, as for carrying out irrigating for thawing, field blocks are irrigated with water until tops of upturned soils are submerged, followed by field soaking for 1-2 hours.

In the present disclosure, the fertilizing is carried out prior to irrigating for thawing; optionally, the fertilizing is carried out in mid to late-March.

In the present disclosure, optional steps of the spring ploughing and land preparation method through thawing and water puddling are as follow:

S101: harvesting rice with low stubble left, where the rice is harvested with a semi-feeding combine harvester, with stubble as low as possible, and the average stubble height is ≤15 cm, the straws are not crushed and are laid flat into rows; leaving low stubble in the fields helps to reduce the amount of straw left in the fields and helps to alleviate the problem of floating straw in the water puddling process in the spring of the following year;

S102: removing straws from the paddy fields, where the straws are packed by a straw baler or packed by manpower and transported out of the paddy fields;

S103: shallow ploughing, where a tractor with a disk plough of not less than 70 horsepower is used for shallow ploughing, with a depth of about 14-16 cm, a missing ploughing rate of ≤5%, and a re-ploughing rate of ≤50%; the salt accumulation in the topsoil from autumn to the following spring is one of the important characteristics that distinguishes saline-sodic paddy fields from ordinary paddy fields; the basic principle is that soluble salts in deep soil move upward with water through soil capillary pores and accumulate, leading to the intensification of salinization in tillage layer soil; shallow ploughing breaks the soil capillary pores, inhibits salt accumulation, and is beneficial to the oxidation and reduction of reducible harmful substances in soil, and promotes the maturation of cultivation layer soil; disk plough is compact in structure and has low tillage resistance, especially suitable for saline-sodic soil which is sticky when wet and hard when dry; shallow ploughing of about 15 cm depth is consistent with the depth of tillage layer in saline-sodic paddy fields, which will not cause the problem of destruction of deep soil structure;

S104: applying base fertilizer, where the base fertilizer is applied according to local production experience;

S105: irrigating for thawing: from late March to early to mid-April, when a natural thawed depth of the soil layer reaches 6-8 cm, field blocks are irrigated and the irrigating is stopped until tops of upturned soils are submerged, followed by field soaking for 1-2 hours; then the upturned soils after shallow ploughing are further thawed through a heat exchange between soil and water, and the overall thawed depth reaches 11-13 cm, with a large number of frozen soil blocks kept at the same time;

S106: water puddling, leveling and discharging, where a tractor with 90 horsepower or more equipped with a puddling machine is immediately used after the fields thawed to carry out water puddling, and the depth of puddling operation is set to 11-13 cm, which is consistent with the depth of the thawed layer, at this time, the sublayer is in a frozen state, which supports the operating machinery, and the sublayer of the frozen soil is only rutted to a depth of 2-3 cm by the tractor wheels, and the mud layer of 2-3 cm is formed by repeated rolling, which is compatible with the 11-13 cm of the puddling machine, and a tillage layer of about 15 cm in depth is formed precisely; the tractor is equipped with a leveler to level the field surface, when the height difference of the field surface is observed to be not more than one cun (a unit of length, ⅓ decimeter), the mechanical operation is stopped, and the drainage port is opened to discharge the surface mud and water from the field surface, and at this time, the tillage layer includes mud, frozen soil pieces of different sizes, and residual straws, etc.; the leveler has a large working area, so that the field leveling is easy to be realized;

S107: drying to promote the soil structure formation of the tillage layer, where the field blocks drained of muddy water are dried out; on the one hand, frozen soil blocks gradually thaw and dry out with the soil in the tillage layer as a whole, the internal pore structure of frozen soil blocks is retained, and the staggered distribution of frozen soil blocks promotes the formation of soil pores distributed in the tillage layer; on the other hand, the decomposition of residual straws is promoted by water replenishment and temperature increase; the duration of drying is not less than 20 days, at which time criss-crossing cracks appear on the field surface, and the depth of drying of the soil in the tillage layer from the surface downward is not less than 10 cm, and the agglomerate of the soil in the tillage layer increases, the pore structure improves, and the supporting force is enhanced. Increased water permeability of the soil in the tillage layer promotes the dissolution of salts in the soil into water, thus accelerating the discharge of salts from the soil; increased permeability of the soil in the tillage layer promotes the exchange of gases between the soil and the atmosphere, and improves the strong reducing environment of the soil in the tillage layer; and increased soil support in the soil in the tillage layer improves the quality of the mechanical transplanting operation, thus promoting the growth of the rice seedlings and increasing the yields.

The present disclosure also provides an application of the above-mentioned method for spring ploughing and land preparation in saline-sodic paddy fields with thawed water puddling in land preparation of saline-sodic paddy fields in western Songnen Plain.

The method for spring ploughing and land preparation in saline-sodic paddy fields with thawed water puddling of the present disclosure takes the problems of poor soil structure and permeability in the tillage layer caused by salinity and alkalinity obstacles, shallow tillage layer, and easy to cause deep mud layer by conventional water puddling operation into full consideration, and realizes high-quality spring ploughing of saline-sodic paddy fields on the basis of low-stubble harvesting of rice and shallow ploughing in autumn to inhibit salt accumulation in the topsoil, with the core of "thawing", combined with water puddling on the surface of the field; and the specific beneficial effects are as follows.

The thawing is achieved through the heat exchange between irrigated water and frozen soil, and by artificially harmonizing the two phenomena that are supposed to occur at different times, namely, the thawing of the soil in the tillage layer for puddling and the maintaining of the frozen soil in the sublayer to support the wheels for rolling, the standard depth of the tillage layer of about 15 cm is guaranteed, which enables the puddling machinery to carry out fine puddling operations, thus ensuring that the surface of the field is smooth.

The plough pan formed by water puddling after "thawing" is flat, which greatly reduces the difficulty of rice-transplanting machinery, reduces missed transplanting, and solves the problem of "no lines, no rows" of the transplanted seedlings, and the seedlings are well aligned.

Drying promotes the formation of soil structure in the tillage layer, and the seedlings are steadily maintained in their original position after transplantation, which solves the problem of the sinking or shifting of the transplanted seedlings due to the excessively soft tillage layer and mud after the conventional water puddling in saline-sodic paddy fields, which results in the suppression of the growth and the lowering of the yields.

After thawing and puddling with water on the field surface, there are still a large number of frozen soil blocks in the tillage layer, and the internal pores of the frozen soil blocks and the external pores formed due to the staggered distribution of the frozen soil blocks significantly improve the air permeability and water permeability of the soil in the tillage layer; improved water permeability facilitates the salt discharge of the soil in the tillage layer, and increased air permeability facilitates the exchange of gases between the soil and the atmosphere, thus facilitating the early growth and rapid development of the rice seedlings after transplanting. At the same time, the frozen soil blocks sink during the puddling process, promoting the formation of a standard paddy field structure of tillage layer in which the upper layer of soil and water are integrated and soft, and the lower layer of soil is loose and airy (commonly known as "upper paste and lower loose").

Conventional water puddling is suitable for operation from late April to early May, while the present disclosure of thawing and water puddling is suitable for operation from late March to early to mid-April, which advances the spring tillage operation by about one month, with important significance for the sparsely populated agricultural areas as well as the future of agriculture where the labor force of the right age is decreasing rapidly.

BRIEF DESCRIPTION OF THE DRAWINGS

In order to explain the embodiments of the present disclosure or the technical scheme in the prior art more clearly, the drawings needed in the embodiments will be briefly introduced below. Obviously, the drawings described below are only some embodiments of the present disclosure, and other drawings may be obtained according to these drawings without creative work for ordinary people in the field.

DETAILED DESCRIPTION OF THE EMBODIMENTS

A number of exemplary embodiments of the present disclosure will now be described in detail, and this detailed description should not be considered as a limitation of the present disclosure, but should be understood as a rather detailed description of certain aspects, characteristics and embodiments of the present disclosure.

It should be understood that the terminology described in the present disclosure is only for describing specific embodiments and is not used to limit the present disclosure. In addition, for the numerical range in the present disclosure, it should be understood that each intermediate value between the upper limit and the lower limit of the range is also specifically disclosed. Intermediate values within any stated value or stated range, as well as each smaller range between any other stated value or intermediate values within the stated range are also included in the present disclosure. The upper and lower limits of these smaller ranges can be independently included or excluded from the range.

Unless otherwise specified, all technical and scientific terms used herein have the same meaning as commonly understood by one of ordinary skill in the art to which this present disclosure relates. Although the present disclosure only describes the preferred methods and materials, any methods and materials similar or equivalent to those described herein can also be used in the practice or testing of the present disclosure. All documents mentioned in this specification are incorporated by reference to disclose and describe methods and/or materials related to the documents. In case of conflict with any incorporated document, the contents of this specification shall prevail.

It is obvious to those skilled in the art that many improvements and changes may be made to the specific embodiments of the present disclosure without departing from the scope or spirit of the present disclosure. Other embodiments will be apparent to the skilled person from the description of the present disclosure. The description and example of that present disclosure are exemplary only.

The terms "including", "comprising", "having" and "containing" used in this specification are all open terms, which means including but not limited to.

Embodiment 1

Figure 1A:
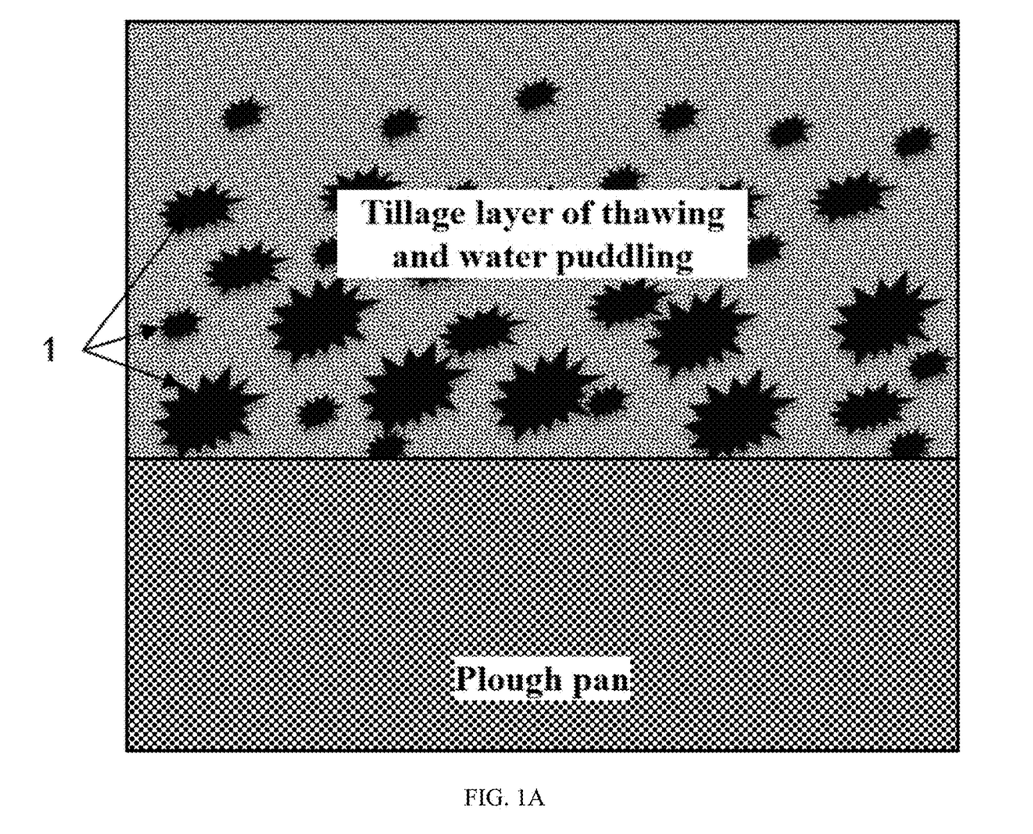
FIG. 1A is a schematic diagram showing the spring ploughing and land preparation method through thawing and water puddling for saline-sodic paddy fields provided by the present disclosure.

FIG. 1A is a schematic diagram showing the spring ploughing and land preparation method through thawing and water puddling for saline-sodic paddy fields provided by the present disclosure, in the figure, 1: frozen soil blocks (varying in size and with certain layers).

Figure 2:
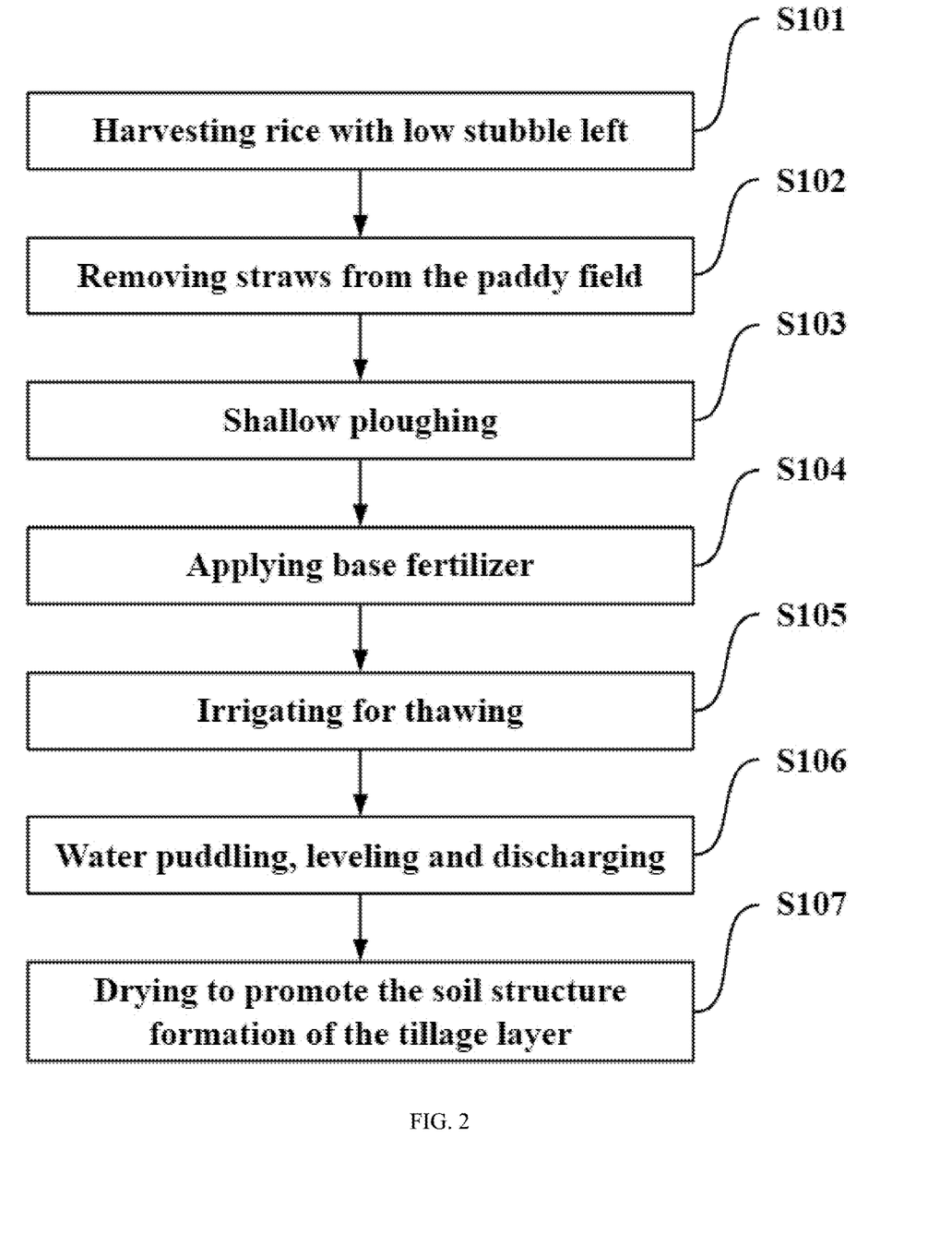
FIG. 2 is a process illustrating the specific steps of the spring ploughing and land preparation method through thawing and water puddling for saline-sodic paddy fields provided by the present disclosure.

Embodiment 1 was carried out from the autumn of 2021 to the autumn of 2022, the saline-sodic paddy fields were located in the Niuxin Taobao Reed Farm, Da'an City, Jilin Province, China, with an area of 10 hectares, and the soil of 0-15 cm tillage layer was analyzed according to the soil-water ratio of 1:5, and the pH was 9.45-9.79, the salt content was 2.26-2.61 g/kg, and the exchangeable sodium percentage was 13.9%-23.5%. With reference to FIG. 2, the specific steps were as follows:

S101: harvesting rice with low stubble left, where a semi-feeding combine harvester was used to harvest rice with low stubble left, the average stubble height was 12 cm, and the straws were not crushed and were laid flat into rows;

S102: removing straws from the paddy field, where the straws were packed manually and transported out of the field blocks;

S103: shallow ploughing, where a 70-horsepower tractor with a drive disk plough was used for shallow ploughing, with a depth of 15 cm, a missing ploughing rate of 5% and a re-ploughing rate of 5%;

S104: applying base fertilizer, where the base fertilizer $N:P_2O_5:K_2O=90$ kg/ha:100 kg/ha:110 kg/ha was applied on Mar. 30, 2022 based on local production experience;

S105: irrigating for thawing: the irrigation was started on Apr. 2, 2022 for thawing, when the natural thawed depth of the soil layer reached about 8 cm, the field was irrigated with water and the irrigation was stopped until the tops of the upturned soils are submerged, and the field was soaked for 1 hour, and the overall thawed depth reached about 12 cm;

S106: water puddling, leveling and discharging, where a tractor with 90 horsepower equipped with a puddling machine was immediately used after the field is thawed to carry out water puddling, and the depth of puddling operation was set to 12 cm, which was consistent with the depth of the frozen layer, at this time, the lower soil was in a frozen state, which may support the operating machinery well, and the sublayer of the frozen soil was only rutted to a depth of 2-3 cm by the tractor wheels, and the mud layer of 2-3 cm was formed by repeated rolling, which was matched with the 12 cm of the puddling machine to form a tillage layer of about 15 cm in depth precisely; the tractor was equipped with a leveler to level the field surface, when the height difference of the field surface was observed to be not more than one cun (⅓ decimeter), the mechanical operation was stopped, and the drainage port was opened to discharge the surface mud and water from the field surface; and S107: drying to promote the soil structure formation of the tillage layer, where the field blocks discharged with muddy water were dried for 25 days, at which time criss-crossing cracks are appeared on the field surface, and the depth of drying of the soil in the tillage layer from the surface downward reached 12 cm.

The technical effects achieved by the method of thawed water puddling in Embodiment 1 are as follows:

before transplanting rice seedlings in mid-May, a 50 cm profile was excavated for observation and sampling analysis. 15 cm below was the solid plough pan, and the 0-15 cm tillage layer had a good structure of "upper paste and lower loose"; when transplanting rice seedlings, the rice transplanter operated smoothly, the seedlings formed lines and rows, the transplanting quality was good with a missing transplanting rate of <1%. The yield of rice harvested in autumn was 7658 kg/ha.

Comparative Embodiment 1

Figure 1B:
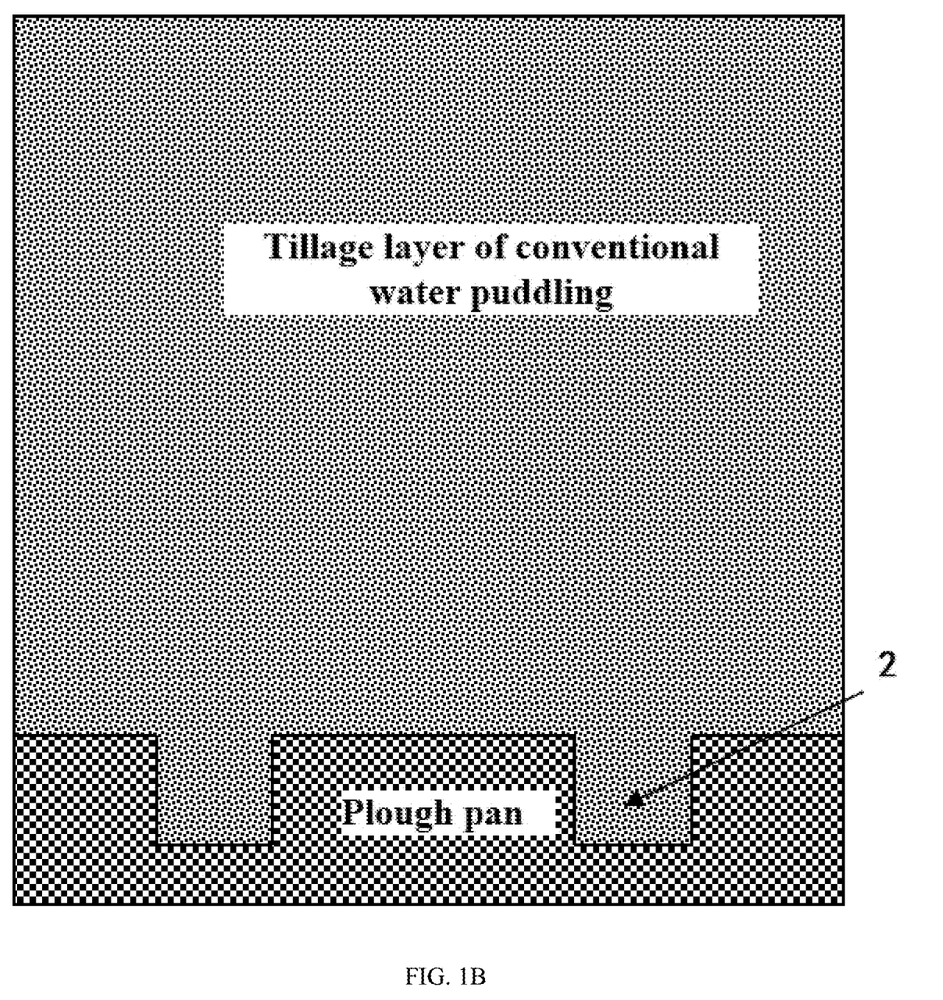
FIG. 1B is a schematic diagram showing the conventional water puddling spring ploughing and land preparation method in saline-sodic paddy fields.

FIG. 1B is a schematic diagram showing the conventional water puddling spring ploughing and land preparation method in saline-sodic paddy fields, and in the figure, 2: rut rolled out by operation vehicle.

Comparative embodiment 1 was carried out with conventional water puddling spring ploughing and land preparation by, which was carried out from the autumn of 2021 to the autumn of 2022. The field was adjacent to the field of Embodiment 1, located in the Niuxin Taobao Reed Farm, Da'an City, Jilin Province, China, with an area of 1 hectare, the degree of soil salinization was the same as that of Embodiment 1, the pH was 9.45-9.79, the salt content was 2.26-2.61 g/kg, and the exchangeable sodium percentage was 13.9%-23.5%. The specific steps were as follows:

(1) harvesting rice, where a semi-feeding or full-feeding combine harvester was used to harvest rice with and average stubble height of 15 cm, and the straws were not crushed and were laid flat into rows;

(2) removing straws from the field, where the straws were packed by manpower and transported out of the field on Apr. 24, 2022;

(3) applying base fertilizer, where the base fertilizer $N:P_2O_5:K_2O=90$ kg/ha:100 kg/ha:110 kg/ha was applied on Apr. 26, 2022 based on local production experience;

(4) rotary tilling, where a 70-horsepower tractor with rotary tiller was used for rotary tilling, and the working depth was set to 15 cm;

(5) soaking the field, where the field was soaked with water for 2 days;

(6) water puddling and leveling, where a 70-horsepower tractor with a puddling machine was used to stir the field with water on May 1, 2022, and the working depth was set at 15 cm; meanwhile, the tractor was equipped with a shovel to level the field surface, and the mechanical operation was stopped when there was no obvious exposure of the straw on the field surface and the height difference is not more than one cun;

(7) fishing out floating objects and discharging, where the floating objects were fished out by manpower using rakes and other tools to avoid hindering seedling transplanting after the floating objects on the field surface were gathered and piled up under the effect of wind blowing, and then the drainage port of the field was opened to discharge the open water on the field surface into the drainage ditch.

The technical effects of Comparative embodiment 1 with the conventional water puddling method were as follows:

before transplanting rice seedlings in mid-May, a 50 cm profile was dug for observation and sampling analysis, and the plough pan appeared until under 30 cm, and the entire 0-30 cm tillage layer showed a basically uniform muddy and unstructured state; when transplanting rice, the rice transplanter operation was unstable, especially obvious when encountering the deep ruts pressed by the puddling machine, the seedlings did not form lines or rows, the missing transplanting rate was about 6%, and the quality of seedling transplanting was poor. The yield of rice harvested in autumn was 6174 kg/ha.

Embodiment 2

Embodiment 2 was carried out from the autumn of 2022 to the autumn of 2023, and the saline-sodic paddy field was located in the Niuxin Taobao Reed Farm, Da'an City, Jilin Province, China, with an area of 30 hectares, and the soil of 0-15 cm tillage layer was analyzed according to the soil-water ratio of 1:5, and the pH was 9.12-9.58, the salt content was 1.66-1.95 g/kg, and the exchangeable sodium percentage was 11.7%-17.2%. The specific steps were as follows:

S101: harvesting rice with low stubble left, where a semi-feeding combine harvester was used to harvest rice with low stubble left, the average stubble height was 15 cm, and the straws were not crushed and were laid flat into rows;

S102: removing straws from the field, where the straws were packed manually and transported out of the field blocks;

S103: shallow ploughing, where a 70-horsepower tractor with a drive disk plough was used for shallow ploughing, with a depth of 15 cm, a missing ploughing rate of 5% and a re-ploughing rate of 5%;

S104: applying base fertilizer, where the base fertilizer $N:P_2O_5:K_2O=90$ kg/ha:100 kg/ha:110 kg/ha was applied on Mar. 18 to Mar. 20, 2023 based on local production experience;

S105: irrigating for thawing: the irrigation was started on Mar. 30, 2023 for thawing, the natural thawed depth of the soil layer reached about 7 cm, the irrigation into the field was stopped until the top of the upturned soil was submerged, and the field was soaked for 1 hour, and the overall thawed depth reached about 12 cm;

S106: water puddling, leveling and discharging, where a tractor with 90 horsepower equipped with a puddling machine was immediately used after the field is thawed to carry out water puddling, and the depth of puddling operation was set to 12 cm, which was consistent with the depth of the frozen layer, at this time, the lower soil was in a frozen state, which may support the operating machinery well, and the sublayer of the frozen soil was only rutted to a depth of 2-3 cm by the tractor wheels, and the mud layer of 2-3 cm was formed by repeated rolling, which was compatible with the 12 cm of the puddling machine to farm a tillage layer of about 15 cm in depth precisely; the tractor was equipped with a leveler to level the field surface, when the height difference of the field surface was observed to be not more than one cun (⅓ decimeter), the mechanical operation was stopped, and the drainage port was opened to discharge the surface mud and water from the field surface; and S107: drying to promote the soil structure formation of the tillage layer, where the field blocks discharged with muddy water were dried for 25 days, at which time criss-crossing cracks were appeared on the field surface, and the depth of drying of the soil in the tillage layer from the surface downward reached 13 cm.

The technical effects achieved by the method of thawed water puddling in Embodiment 2 were as follows:

before transplanting rice seedlings in mid-May, a 50 cm profile was excavated for observation and sampling analysis. 15 cm below was the solid plough pan, and the 0-15 cm tillage layer had a good structure of "upper paste and lower loose"; when transplanting rice seedlings, the rice transplanter operated smoothly, the seedlings formed lines and rows, the transplanting quality was good with a missing ploughing rate of <1%. The yield of rice harvested in autumn was 8496 kg/ha.

Comparative Embodiment 2

Comparative embodiment 2 was carried out with conventional water puddling for spring ploughing and land preparation from the autumn of 2022 to the autumn of 2023. The field was adjacent to the field of Embodiment 2, located in the Niuxin Taobao Reed Farm, Da'an City, Jilin Province, China, with an area of 1 hectare, the degree of soil salinization was the same as that of the Embodiment 2, the pH was 9.12-9.58, the salt content was 1.66-1.95 g/kg, and the exchangeable sodium percentage was 11.7-17.2%. The specific steps were as follows:

(1) harvesting rice, where a semi-feeding or full-feeding combine harvester was used to harvest rice with and average stubble height of 15 cm, and the straws were not crushed and were laid flat into rows;

(2) removing straws from the field, where the straws were packed by manpower and transported out of the field at the end of April 2023;

(3) applying base fertilizer, where the base fertilizer $N:P_2O_5:K_2O=90$ kg/ha:100 kg/ha:110 kg/ha was applied based on local production experience;

(4) rotary tilling, where a 70-horsepower tractor equipped with a rotary tiller was used for rotary tilling, and the working depth was set to 15 cm;

(5) soaking the field, where the field was irrigated with water for soaking for 2 days;

(6) water puddling and leveling, where a 70-horsepower tractor with a puddling machine was used to stir the field with water on May 3, 2023, and the working depth was set at 15 cm; meanwhile, the tractor was equipped with a shovel to level the field surface, and the mechanical operation was stopped when there was no obvious exposure of the straw on the field surface and the height difference is not more than one cun;

(7) fishing out floating objects and discharging, where the floating objects were fished out by manpower using rakes and other tools to avoid hindering seedling transplanting after the floating objects on the field surface were gathered and piled up under the effect of wind blowing, and then the drainage port of the field was opened to discharge the open water on the field surface into the drainage ditch.

The technical effects of Comparative embodiment 2 with the conventional water puddling method were as follows:

before transplanting rice seedlings in mid-May, a 50 cm profile was dug for observation and sampling analysis, and the plough pan appeared until under 28 cm, and the entire 0-28 cm tillage layer showed a basically uniform muddy and unstructured state; when transplanting rice, the rice transplanter operation was unstable, especially obvious when encountering the deep ruts pressed by the puddling machine, the seedlings did not form lines or rows, the missing transplanting rate was about 5%, and the quality of seedling transplanting was poor. The yield of rice harvested in autumn was 7513 kg/ha.

The implementation results show that, by applying the method of the present disclosure, in the saline-sodic paddy fields with the pH of 9.12-9.79, the salt content of 1.66-2.61 g/kg and the exchangeable sodium percentage of 11.7-23.5%, the 0-15 cm tillage layer has a good structure of "upper paste and lower loose", the transplanter works smoothly, the seedlings are in lines and rows, and the quality of seedling transplanting is good with a missing transplanting rate of less than 1%. The yield of rice reaches 7658-8469 kg/ha.

The above-mentioned embodiments only describe the preferred mode of the present disclosure, and do not limit the scope of the present disclosure. Under the premise of not departing from the design spirit of the present disclosure, various modifications and improvements made by ordinary technicians in the field to the technical scheme of the present disclosure shall fall within the protection scope determined by the claims of the present disclosure.

What is claimed is:

1. A method for spring ploughing and land preparation with thawed water puddling applied to saline-sodic paddy fields in western Songnen Plain, comprising following steps:
   (1) harvesting rice with low stubble left, wherein an average stubble height of the rice is ≤15 cm;
   (2) removing straws from fields: removing straws after harvesting from the fields;
   (3) ploughing: ploughing at a surface depth of 14-16 cm, breaking soil capillary pores and inhibiting salt return, making a ploughing depth consistent with a depth of a tillage layer in the saline-sodic paddy fields, without causing damage to a deep soil structure; wherein a missing ploughing rate of the ploughing is ≤5%, and a re-ploughing rate is ≤5%;
   (4) fertilizing, wherein a time of the fertilizing is in mid to late-March;
   (5) irrigating for thawing: from late March to early to mid-April, when a natural thawed depth of a soil layer reaches 6-8 cm, field blocks are irrigated with water and the irrigating is stopped until tops of upturned soils are submerged, and the field blocks are soaked for 1-2 hours; then the upturned soils after shallow ploughing is further thawed through a heat exchange between soil and water, and an overall thawed depth reaches 11-13 cm, with a large number of frozen soil blocks kept at a same time;
   (6) carrying out water puddling operation: carrying out the water puddling operation, and a water puddling operation depth is 11-13 cm, consistent with a depth of a thawed layer, wherein a sublayer of the soil is in a frozen state, capable of supporting an operation machinery well; ruts of 2-3 cm in depth are formed at a sublayer of frozen soil by wheel rolling, and a mud layer of 2-3 cm is formed by repeated rolling, matching with a puddling machine of 11-13 cm to form a tillage layer of about 15 cm in depth; and (7) drying, wherein the drying continues for not less than 20 days, then criss-crossing cracks appear on field surfaces, and a soil in the tillage layer is dried to a depth of not less than 10 cm from a surface downwards.

* * * * *